(12) United States Patent
Mottale

(10) Patent No.: US 10,252,799 B2
(45) Date of Patent: Apr. 9, 2019

(54) MULTI-TASK FRISBEE-UMBRELLA

(71) Applicant: Sima Mottale, Castagnola (CH)

(72) Inventor: Sima Mottale, Castagnola (CH)

( * ) Notice: Subject to any disclaimer, the term of this patent is extended or adjusted under 35 U.S.C. 154(b) by 86 days.

(21) Appl. No.: 14/698,803

(22) Filed: Apr. 28, 2015

(65) Prior Publication Data

US 2015/0360777 A1 Dec. 17, 2015

Related U.S. Application Data

(60) Provisional application No. 61/986,615, filed on Apr. 30, 2014.

(30) Foreign Application Priority Data

Apr. 25, 2015 (EP) ..................................... 15165141

(51) Int. Cl.
*B64C 39/00* (2006.01)
*B64C 27/04* (2006.01)
(Continued)

(52) U.S. Cl.
CPC ............ *B64C 39/024* (2013.01); *B64C 27/04* (2013.01); *B64C 27/10* (2013.01); *B64C 39/08* (2013.01);
(Continued)

(58) Field of Classification Search
CPC ..... B64C 11/005; B64C 11/007; B64C 11/12; B64C 11/28; B64C 27/10; B64C 27/50;
(Continued)

(56) References Cited

U.S. PATENT DOCUMENTS 2,101,399 A * 12/1937 Larsen .................... B64C 25/52
244/17.17
2,397,632 A * 4/1946 Stuart ..................... B64C 29/02
244/17.23
(Continued)

FOREIGN PATENT DOCUMENTS

DE 3400379 A1 * 7/1985 ............. B64C 31/04
DE 3521624 A1 * 12/1986 ............. B64C 39/06
(Continued)

OTHER PUBLICATIONS

Geobeats, 10 Incredible Micro-Robots, YouTube, published on Nov. 27, 2014, all enclosed pages cited.
(Continued)

*Primary Examiner* — Richard R. Green
(74) *Attorney, Agent, or Firm* — Nelson Mullins Riley & Scarborough LLP

(57) ABSTRACT

The present invention discloses an unmanned aerial vehicle capable of transforming its shape, comprising
a) a control apparatus
b) one or more propellers being fixed to the control apparatus,
c) a multitude of flaps which are foldable reversibly from an open to a closed position, wherein the flaps provide i) in open position about a disc shape which is about in parallel to the plane of the rotating propeller, and ii) in closed position a shuttlecock shape,
wherein, at least one of the flaps comprises a battery recharge element, such as a solar panel, photovoltaic element or elements, an electromagnetic harvesting element, a thermoelectric generator and/or a solar thermoelectric generator. The present invention relates also to a rotating disc being suitable for the vehicle, as well as the use of the vehicle and the rotating disc.

20 Claims, 5 Drawing Sheets

Figure 1:
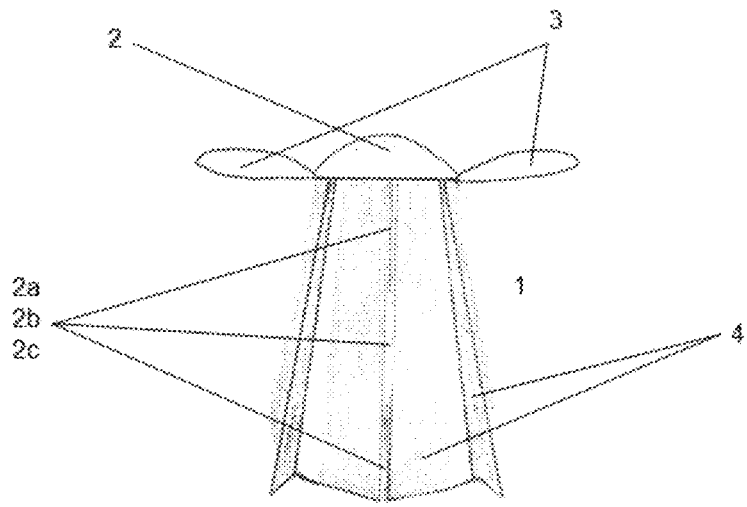

(51) Int. Cl.
*B64C 27/10* (2006.01)
*B64C 39/02* (2006.01)
*B64C 39/08* (2006.01)
*B64D 47/08* (2006.01)

(52) U.S. Cl.
CPC ........ *B64D 47/08* (2013.01); *B64C 2201/024* (2013.01); *B64C 2201/042* (2013.01); *B64C 2201/066* (2013.01); *B64C 2201/102* (2013.01); *B64C 2201/108* (2013.01); *B64C 2201/126* (2013.01); *B64C 2201/146* (2013.01)

(58) Field of Classification Search
CPC ... B64C 39/001; B64C 39/003; B64C 39/006; B64C 39/008; B64C 39/06; B64C 39/08; B64C 2201/102; B64D 19/00; B64D 19/02
See application file for complete search history.

(56) References Cited

U.S. PATENT DOCUMENTS

| | | | | |
|---|---|---|---|---|
| 3,253,810 A | * | 5/1966 | Penn | B64D 45/00 244/138 A |
| 3,542,317 A | * | 11/1970 | Irby | B64C 39/001 244/105 |
| 3,666,290 A | * | 5/1972 | Dalton | B60S 9/02 16/42 T |
| 7,559,506 B2 | * | 7/2009 | Kissel, Jr. | B64C 39/001 244/17.11 |
| 7,789,341 B2 | * | 9/2010 | Arlton | B64C 27/10 244/17.23 |
| 2007/0034738 A1 | | 2/2007 | Sanders, Jr. et al. | |
| 2013/0061605 A1 | * | 3/2013 | de Rochemont | B64D 15/12 62/3.5 |
| 2014/0299708 A1 | * | 10/2014 | Green | B64C 27/50 244/17.23 |

FOREIGN PATENT DOCUMENTS

| | | | | |
|---|---|---|---|---|
| EP | 1674819 A1 | | 6/2006 | |
| EP | 1982914 A2 | | 10/2008 | |
| GB | 190926097 A | * | 11/1910 | B64C 11/00 |
| GB | 474005 A | * | 10/1937 | B64C 27/12 |
| WO | WO-2012160111 A2 | * | 11/2012 | B64C 27/50 |
| WO | 2014025444 A2 | | 2/2014 | |

OTHER PUBLICATIONS

Secureteam10, Media Coverup: Mass UFO Sighting Over Arizona Desert!, published on Apr. 15, 2017, YouTube, all enclosed pages cited.

DARPA reveals details of unique technology for tactical squads and first responders, Defence Blog, Aug. 3, 2018, <http://www.armenianissueblog.org/darpa-reveals-details-of-unique-technology-for-tactical-squads-and-first-responders/>, accessed on Sep. 14, 2018, all pages enclosed cited.

* cited by examiner

MULTI-TASK FRISBEE-UMBRELLA

The present invention relates to an unmanned aerial vehicle capable of transforming its shape, a rotating disc being suitable for the vehicle, as well as the use of the vehicle and the rotating disc.

Small aircrafts, also named drones or unmanned aerial vehicle (UAV), play an increasingly high relevance in e.g. surveillance, rescue, investigation as well as police and military actions.

Known UAV's have to be launched from a launcher, or they lack the ability to fly fast and resist strong wind and hard weather conditions. Due to their limited power storage and charging ability, todays UAV's have to return to the base for refuel or recharge. Thus, they are limited in their capabilities and mission performance, e.g. the can perform short term missions only.

US 2007/0034738 A1 discloses a hover aircraft which employs an air impeller engine having an air channel duct and a rotor with outer ends of its blades fixed to an annular impeller disk that is driven by magnetic induction elements arrayed in the air channel duct. EP-A-1 982 914 discloses an unmanned aerial vehicle using an electric battery driven electric engine, which can be remote controlled. Both disclosures miss e.g. features for battery recharge and transforming its shape to adapt to various requirements.

Thus it was one object of the invention to provide a UAV which avoids the disadvantages of the prior art. In particular, it was the object of the present invention to provide a UAV which is capable for missions over days, weeks or even months, thus it has to be able to recharge its batteries itself by one, ideally two or more different sources of energy. Furthermore, it was another object of the invention that the UAV can land and take off by itself, i.e. without the aid of e.g. a person and/or a launching platform.

Surprisingly it was found that these high demanding and complex objects can be solved by an unmanned aerial vehicle (1) comprising
 a) a control apparatus (2), the control apparatus comprises
  i. one or more batteries (2a),
  ii. one or more engines (2b), and
  iii. a communication transmission system for remote control,
 b) one propeller (3), or more propellers capable of rotating around the same axis, the one or more propellers (3) are fixed to the control apparatus (2),
 c) a multitude of flaps (4) which are foldable reversibly from an open to a closed position, the flaps (4) being fixed symmetrically around the control apparatus (2), wherein the flaps (4) provide
  i. in open position about a disc shape which is about in parallel to the plane of the rotating propeller (3), and
  ii. in closed position a shuttlecock shape,
wherein, when the flaps (4) are in open position, they form a covered, i.e. closed, area, and wherein at least one of the flaps (4) comprise a battery recharge element, the battery recharge element comprises at least a solar panel, photovoltaic element or elements, an electromagnetic harvesting element, a thermoelectric generator and/or a solar thermoelectric generator.

The unmanned aerial vehicle (1), i.e. UAV, of the invention, is also named according to the invention small aircraft, drone, saucer or—due to its multi-task capabilities and its specific forms in open and closed position—Multi-Task Frisbee-Umbrella, abbreviated as MTFU. Additionally, the term vehicle is used as well.

The term Shuttlecock shape, according to the present invention, is understood to include also the term missile shape as well as closed umbrella shape.

The term disc shape, according to the invention, is understood to include open cones shape, open umbrella shape, Frisbee shape and similar shapes. Hence, the disc shape does not require a flat and even surface, but it includes also other, but similar, forms.

The term battery includes—according to the present invention—also electrically operated battery as well as the term accumulator.

The MTFU (1) of the invention has many advantages, including—but not limited to—long term multi-task missions. The MTFU (1), i.e. vehicle (1), is remote operable of e.g. up to ten thousands of kilometers. Thus, the remote operator may supervise from his base the function of the device e.g. through a monitor from long distance. Thus the MTFU can remain in enemy territory while hidden to recharge or to remain in sleeping/pause mode for the next phase or the continuation of their mission. Furthermore, it has the capability to transform its shape due to the foldable flaps (4) from an open position having about a disc or Frisbee shape which is about in parallel to the plane of the rotating propeller (3) into a closed position with a shuttlecock, closed umbrella or missile shape in order to adjust to the environmental or other requirements. Additionally, it may transform its shape into any intermediate position, e.g. to obtain optimal camouflape. It can fly either with the flaps (4) being in open position, thus being in disc shape, with the flaps (4) being in closed position, thus having a shuttlecock shape, or having the flaps (4) in any intermediate shape. Hence, the vehicle (1) is capable of transforming its shape according to the various requirements. In addition, the MTFU (1), i.e. vehicle (1), may well be capable of freeing itself when e.g. captured or when became entangled e.g. by immediately liberating sufficient energy and/or by making use of weapons available.

The MTFU (1), i.e. vehicle (1), of the invention is capable to take off and land vertically, i.e. in hover position. When the flaps (4) are in open position, i.e. when the vehicle (1) is in disc shape, the disc can rotate itself like a Frisbee in hover position. When the flaps (4) are in closed position, i.e. when the vehicle (1) is in shuttlecock shape, the vehicle (1) can rotate according to necessity.

Hence, the MTFU (1), i.e. vehicle (1), of the invention may become a highly valuable tool for the police in crowd control or special operations. It can also be applied to large-scale military operations, border control, hostage situations, urban fighting and targeted fighting in dense buildings, and narrow alleys both in active and passive modes. It can be used above and below the ground such as in underground tunnels or under water in a water-proof version. The MTFU may also enter underground tunnels, caves or any terrorist hideout. When used in military operations, it may be used to pacify the enemy or sabotage and/or destroy enemy's ammunition and storages of various types of equipment. It can attack shipments of ammunition and all types of enemy's equipment prior to arrival to the destination. It is also possible to employ the MTFU in large-scale military operations, urban fighting and targeted fighting in dense buildings, and narrow alleys in active and passive modes and/or in and/or under water in a water-proof version.

The MTFU (1), i.e. vehicle (1), may be made for use in military combat or civilian crises for the riot police facing the mob or certain hostage situations in order to temporarily disable or pacify the aggressor(s) depending upon the circumstances or wherever applicable. It could also be used in specific targeting when the subject hides amongst the civilians to avoid unwanted casualties. Furthermore, a multitude of MTFU (1), i.e. vehicles (1), may be grouped together and perform, e.g. when in combat, in coordinated lines or arrangements different tasks. For such cases it might be advantageous when the employed MTFU (1), i.e. vehicle (1), are a number of different designs with different functions and capable of performing different tasks. Due to its capabilities, it may be of very high value to free hostages, e.g. by making use of its laser if equipped with one, thus it may cut holes through windows, metals, wood and other solid materials.

Claimed also is a rotating disc comprising a ring, the flaps (4), in particular a multitude of the flaps (4), the joints, the generator and a battery (2a) to store the generated electric energy, wherein the flaps (4) are attached through joints to the ring which forms a rotating disc, and the generator is capable to turn rotation of the rotating disc into electric energy, preferably when the rotation of the rotating disc is powered by hydraulic and/or wind energy. Additionally, the rotating disc comprises, as optional further components, a motor or engine (2b) and/or a converter (2c), which may be placed e.g. on a surface of the flaps (4), in or around the ring.

The rotating disc is preferably attached to the control apparatus (2). The flaps (4) can be turned with a joint in open position to remain in open position, preferably to be turned by an angle of 30° or more, in particular by an angle of up to 90° or more, to form a turbine-like shape. This allows the usage of the rotating disc e.g. as a wind mill, a water wheel and/or a water turbine. The flaps (4) further comprise a battery recharge element, the battery recharge element comprises at least a solar panel, photovoltaic element, such as e.g. solar panel, photovoltaic paint, photovoltaic foil and/or photovoltaic film, an electromagnetic harvesting element, a thermoelectric generator and/or a solar thermoelectric generator. Hence, the rotating mill provides various functions and is capable of generating electric power by different means.

It was surprisingly found that the rotating disc has many advantages. In particular it was found that due to its design it is capable of recharging the battery or batteries (2a) by various means, such as solar energy by e.g. photovoltaic elements, such as e.g. solar panel, photovoltaic paint, photovoltaic foil and/or photovoltaic film, and/or solar thermoelectric generators, electromagnetic energy by e.g. electromagnetic harvesting elements, heat by e.g. a thermoelectric generator and/or a solar thermoelectric generator, wind and/or water, i.e. hydraulic, energy by e.g. using the rotating disc as a wind mill, water wheel and/or water turbine. Thus the rotating disc is a system of energy supply/compensation so that the vehicle, during movement or operation, may not have to stop to recharge at a charging station. Thus it can continue to move/operate for a long period of time.

Furthermore, it was surprisingly found that the rotating disc according to the invention is not limited to the vehicle of the invention. Hence, it may be applied as a source of power supply/compensation to the automobile, shipping and boating, aviation, aero-space industry, housing, in particular in remote areas, as well as all electric-battery operated units and devices for energy compensation, generation, storage, supply and support.

Claimed also is the use of the vehicle according to the invention for above ground and/or underground operations, military-, police- and/or scientific-type of operations, outdoor and/or indoor investigations such as surveillance and/or searching for casualties, e.g. after earthquakes, anti-terror operations, border control, crowed control, hostage situations, as well as above, on and/or under water. Hence it may float or move below the waters as a point of refuge/pause or for power recharge using its rotational movement as a water mill. Due to its multi-task capabilities, it is also highly suitable for e.g. large-scale military operations, urban fighting and targeted fighting in dense buildings, and narrow alleys both in active (i.e. hurting) and passive (i.e. apprehension and/or confusion) modes.

Furthermore, claimed is also the use of the rotating disc for energy compensation and/or generation, i.e. for recharging the battery or batteries (2a), by various means, e.g. using solar energy, preferably by photovoltaic elements and/or solar thermoelectric generators, electromagnetic energy, preferably by electromagnetic harvesting elements, heat, preferably by a thermoelectric generator and/or a solar thermoelectric generator, wind and/or water, i.e. hydraulic, energy by e.g. using the rotating disc as a wind mill or water wheel.

The Multi-Task Frisbee-Umbrella (MTFU), i.e. the Unmanned Aerial Vehicle (UAV), (1)

The multi-task frisbee-umbrella (MTFU) (1), i.e. the unmanned aerial vehicle (UAV), i.e. the vehicle (1) according of the present invention preferably comprises additional devices, i.e. apparatus and/or elements. As a matter of facts, it is not limited to the amount and type of further devices, as long as the amount and size of the devices are adjusted to the size of the vehicle. The skilled person is well aware of how to select properly the right type, amount, measurements and size of the various devices. These additional devices are preferably placed in or on the vehicle control apparatus (2) and/or in or on some or all the flaps (4), wherein it is often preferred to place these additional devices on the top, bottom and/or rear of the flying vehicle, either on the control unit and/or on all or some of the flaps (4) to have the possibility to function from both top view and bottom or rear view.

Suitable additional devices comprise, but are not limited to, at least one of the group selected from various types of camera (5a, 5b), visible and/or infrared light source, i.e. lights (6) which might be multi colorful lights, suitable for night vision; holographic projection device, sound device, variable frequency sound device, microphone, GPS system, data-recording device, gyroscopes to increase stabilisation of the vehicle during flight, such as e.g. triaxial miniature gyroscopes, laser device, microwave device, electro-magnetic device, warhead, weapon systems, multi-spectral weapon systems and fused multi-spectral weapon systems or capabilities to function from all directions, including but not limited to exerting mild electric impact (7) and optionally aerosol containing devices (8) to liberate aerosols; electromagnetic power, all and various sound frequencies and beams such as laser beams, as well as a source for microwave generation. Furthermore, the MTFU (1), i.e. vehicle (1), may contain the capability of self-destruction to avoid that non-authorized persons may analyse confidential material and/or information. Such a self-destruction may be obtained by immediate release of stored electricity to e.g. destroy and/or burn relevant devices such as data storage. Additionally, special sounds and or beams (10) of any type or frequency for various purposes may be created and emitted, including but not limited to create the transfer of special verbal messages such as orders, etc. They could control, redirect, debilitate, discourage, pacify or stunt the subject, both in active (i.e. hurting) and passive (i.e. apprehension and/or confusion) mode. Preferably, these devices such as weapons are small, micro or even nano size devices and/or weapons. All these devices are known to the skilled person in the art.

In a preferred embodiment, the camera (5a, 5b) is a surveillance camera, high resolution camera, TV-camera, day light camera, UV-light camera, an infra-red camera and/or a thermographic camera. The description "(5a, 5b)" highlights that there are different types of camera possible, but it is not assigned to specific types of camera.

Furthermore, the MTFU (1), i.e. vehicle (1), according to the invention may further recharge its battery or batteries (2a) from power lines and/or telephone lines. Hence, the MTFU (1) may be equipped with a suitable recharge device such as wires. Alternatively, or in addition, the battery or batteries (2a) may be recharged by using hydraulic and/or wind energy by means of the rotating disc according to the invention, e.g. by using its rotational movement as a water mill.

In one preferred embodiment, the MTFU (1), i.e. the vehicle (1), of the invention comprises a number of wheels (12), preferably gyroscopic wheels, wherein the wheels (12) are preferably flushable and/or pivotable, and/or small and resistant. The wheels (12) are preferably attached to outer edge of the flaps (4) or via a—e.g. extendable—rod to the control apparatus (2), which allows—among others—a smoother rotational take off. Furthermore, the wheels (12) are preferably arranged symmetrically around MTFU (1). This allows the MTFU (1) to be placed on the wheels (12) also when the flaps (4) are in closed position, e.g. when the MTFU (1) is in the shape of a shuttlecock, missile or closed umbrella. Thus, in this position are the control apparatus (2) and the propeller (3) are away from ground.

In another preferred embodiment, the MTFU (1), i.e. the vehicle (1), of the invention comprises a number of durable pads, which may be made of soft materials. The pads are preferably flushable and/or pivotable. The pads (9) may be of a number of different material and function, including vacuum cups, i.e. suction cups, or adhesive, preferably a gecko-type adhesive such as e.g. a material called Geckskin™, and/or a pressure sensitive adhesive to enable sticking on various substrates, such as on ground, wall and/or ceiling. These pads (9) allow the MTFU (1) to be fixed for any needed amount of time, e.g. for hideouts, pause and/or to recharge batteries (2a). The pads (9) are preferably attached to outer edge of the flaps (4), i.e. peripheral borders, or via a—e.g. extendable—rod to the control apparatus (2). Furthermore, the pads (9) are preferably arranged symmetrically around MTFU (1). This allows the MTFU (1) to be placed on the pads (9) also when the flaps (4) are in closes position, e.g. when the MTFU (1) is in the shape of a shuttlecock, missile or closed umbrella. Thus, in this position are the control apparatus (2) and the propeller (3) are away from direct physical contact with the ground.

The MTFU (1), i.e. vehicle (1), is preferably of small to very small size. MTFU (1) with bigger sizes may range e.g. up to about one or two meters, in particular up to about twenty to forty centimeters. MTFU (1) with very smaller sizes may range e.g. down to about 0.1 mm, in particular down to about 0.5 to 1 mm or even smaller. Hence, the MTFU (1), i.e. vehicle (1), may be of micro- or even nanoscale.

In one embodiment, the peripheral borders, outer edge of the flaps (4), of the MTFU (1), i.e. vehicle (1), i.e. saucer, are equipped with durable pads (9), e.g. suction cups, which have a rolling and/or crawling capability. Thus, whenever the saucer is not flying in rotation, it can land on its cups and roll, crawl or stick on any surface using its cups in different motions such as rolling or an air-tight grabbing function.

The remote operable MTFU (1), i.e. vehicle (1), according to the invention, in particular the control apparatus (2) and/or the foldable flaps, are made of either both rigid or non-rigid, i.e. flexible, or solely non-rigid or solely rigid material. Non-limiting examples include lightweight, heat resistant materials such as special metals, light metal, graphite, carbon fiber, carbon fiber composites, ceramics and or silicon.

The MTFU (1), i.e. vehicle (1), according to the invention may involve a fast rotating saucer or rotating disc holding an electric battery in the center. The battery may be surrounded by a few surveillance mini-cameras (5a, 5b) as shown on figure number 1. The shown mini-cameras (5a, 5b) may also have night vision capability and are capable of sending views from both the inside and outside of the MTFU (1), i.e. saucer. In other words, they function from both sides. The saucer may comprise e.g. about six or eight segments, each alternately carrying various tasks. In between every two segments, there is a folding segment serving for closure in a pseudo-umbrella form.

The saucer can be used in a double layer form along with a second saucer made of light metal where the segments serve as solar panels for extra energy if used in a sunny area. The two saucers are connected in the center through a longer electric battery. When in use as a double layered saucer, the mounting piece may be larger, slightly more introverted and carry the peripheral suction cups. It may also carry, in its caves, more power storage or other substances for emission, feeding the lower saucer.

Some chambers or portions of some segments may be designated for the purpose of self-destruction or the destruction of the sensitive parts, should the device be trapped, be exhausted of energy during mission, etc. or whenever deemed necessary by the remote operator.

The MTFU (1), i.e. vehicle (1), of the invention may also be programmed to fly back to its launching base upon a specific event, e.g. when the communication with the operator or base is lost, or when the battery cannot be recharged anymore.

The Frisbee-umbrella may be used in a small version (the size of a spider) to land on the subject, using only a couple of its functions, such crawling or jumping while exerting mild electric impact along with vibration from spot to spot, as it moves or jumps.

This whole idea may also be made in a small globe form/version, made of either mixed rigid and non-rigid materials or solely one of the two. One hemisphere or both may hold respectively one or two batteries (2a). The device may open in two hemispheres, still connected to each other in a peripheral point on one side. Same functions then can be performed through the inside of the two hemispheres, now facing the subject. The suction cups may be inlaid from within and as the globe opens, they may come out. The globe may hold a few mini-cameras (5a, 5b) on its surface, showing the view both from inside and outside.

The Control Apparatus (2)

The control apparatus (2) comprises at least i) one or more batteries (2a), ii) one or more engines (2b), and iii) a communication transmission system for remote control. The battery i) is designed to provide sufficient energy for the propeller (3) as well as any present joint or engine requiring electric power. Furthermore, the battery i) is designed to get recharged by the various battery recharge elements being part of the MTFU (1). In case a converter (2c) is required to adopt the current, it may be part of the battery, the battery recharge elements and/or being present as a separate unit.

The control apparatus (2) can be made from durable, flexible and/or rigid material which are preferably heat-resistant. The skilled person in the art is well aware of suitable materials. Preferred, non-limiting materials include metal, in particular light metal, ceramic material, graphite, silicone, carbon fibres and/or carbon fibre reinforce material.

The Propeller (3)

The unmanned aerial vehicle (1), i.e. MTFU (1), of the invention comprises one or more propellers (3), each propeller (3) has typically two or more blades. If more than one propeller (3) is present, they are arranged so that they are capable of rotating around the same axis, thus being one above the other. The one or more propellers (3) are fixed to the control apparatus (2).

The propellers (3) may rotate on the top and/or the rear of the control apparatus (2). Preferably, they rotate around the side of the control apparatus (2) in order to reserve the top, i.e. upper side, and the bottom, i.e. the lower side, of the control apparatus (2) for additional devices thereupon.

The propeller (3) is preferably of conventional design, including, but not limited to, controllable-pitch propeller, skewback propeller and/or of aerofoil shape. The skilled person is well aware which propeller may be used.

The Flaps (4)

The unmanned aerial vehicle (1), i.e. MTFU (1), of the invention comprises a multitude of flaps (4), also called, according to the present invention, wings and lamellas, which are foldable, i.e. movable, reversibly from an open to a closed position, thus transforming an open, disc or Frisbee shape into a closed, shuttlecock or closed umbrella position. Thus the flaps (4) preferably contain or are linked mechanically or magnetically to a joint with a motor such as an electric motor, to enable folding of the flaps (4) during rest as well as during flight. The flaps (4) being fixed symmetrically around the control apparatus (2), wherein the flaps (4) provide i) in open position about a disc shape which is about in parallel to the plane of the rotating propeller (3), and ii) in closed position a shuttlecock shape. When the flaps (4) are in open position, the unfolded flaps (4) form a covered, i.e. closed, area, e.g. in the form of a disc or Frisbee.

Furthermore, at least one of the flaps (4), preferably all of the flaps (4), comprise, and thus are preferably covered with, a battery recharge element, the battery recharge element comprises at least a solar panel, photovoltaic element, an electromagnetic harvesting element, a thermoelectric generator and/or a solar thermoelectric generator. In one preferred embodiment, one of each flap surface is fully covered with a battery recharge element. In another preferred embodiment, each flap surface is fully covered with a battery recharge element, wherein one surface of the flap (4) is covered with one and the other flap surface is covered with another battery recharge element.

In even another preferred embodiment, the flaps (4), i.e. wings, i.e. lamellas, are attached either directly to the control apparatus (2) or to a ring which is attached to the control apparatus (2), wherein the ring is preferably a ring which can expand and shrink its dimensions. Such a ring which can expand and shrink its dimensions may be made of different design, such as from a multitude of telescopic elements, wherein the expansion and shrinkage of these elements may be enabled by engines (2b), preferably electrically powered engines.

When all flaps (4) are the same size, the MTFU (1) turns, when the flaps (4) are folded inwards, into a slim, almost tubular missile shape, when in closed position. A few flaps (4) may push upwards to form wings. A non-limiting design of this embodiment is shown in FIG. 1.

In a particularly preferred embodiment, each flap (4) of the vehicle (1) according to the invention is attached, preferably magnetically or mechanically, to the control apparatus (2) or to the ring via a joint and each flap (4) of the rotating disc according to the invention, is attached to the ring via the joint, wherein the flap (4) can be turned with the joint in open position to remain in open position, preferably to be turned by an angle of 30° or more, in particular by an angle of up to 90° or more, to form a turbine-like shape. Hence, the vehicle (1) and the rotating disc, respectively, becomes a wind mill, a water wheel and/or a water turbine. As a matter of fact, in this particularly preferred embodiment there might be two different joints or one joint with both features, namely one to enable to close the flaps (4) magnetically or mechanically to form a shuttlecock shape and the other to turn, i.e. to twist the flaps (4) e.g. in open position to provide a turbine form. For the rotating disc of the inventions, these types of joints are employed.

When the flaps (4) are attached to the ring forming a rotating disc, the rotating disc preferably comprises the flaps (4) and a generator to turn the rotation of the rotating disc into electric energy, preferably when the rotation of the rotating disc is powered by hydraulic and/or wind energy.

The flaps (4) of the vehicle (1), i.e. MTFU (1), according to the invention and of the rotating disc according to the invention may comprise flaps (4) of the same or different size, shape or material. In other words, it is possible that e.g. a first type of flaps (4) may be at the outer edge broader than a second type of flaps (4). It is possible that the first and second types of flaps (4) are alternating, or that there is a number of first type of flaps (4) in a sequence, followed by the same or another number of second type of flaps (4). It is even possible that there is even a third or higher number of further types of flaps (4). However, it is in general preferred that the different types of flaps (4) are arranged symmetrically around the control apparatus (2) or the ring.

The flaps (4) may be of rigid and/or flexible and preferably heat-resistant material. When different types of flaps (4) are present, it is possible that one type may be of rigid and the other type is of flexible material. Rigid flaps (4) may be formed e.g. from light metal, ceramic material, graphite, carbon fibres and/or carbon fibre reinforce material. Flexible flaps (4) may be formed e.g. from silicone or flexible, high resistant tissues. All these materials are known to the skilled person who is also capable to make the proper selections.

In a preferred embodiment, the flaps (4) from the vehicle (1), i.e. MTFU (1), and/or the rotating disc comprise a coupling device at the side edges of the flaps (4) to couple the adjacent flaps (4) together. The coupling device may be a mechanical device such as a joint, a magnet and/or electromagnet. The coupling of the adjacent edges is of particular relevance when the flaps (4) are in open position and thus have a disc or Frisbee shape.

The flaps (4) may be covered with solar energy panels or solar materials and/or solar film material on one or both sides for solar power. They may receive solar power from both sides as they rotate. In addition, the rotating movement along with any particular positioning of the flaps (4), during rotation, can use wind energy as another source of energy compensation or energy generation. Thus, the MTFU (1) and the rotating disc become a multi-power source. The disc may also charge on electro-magnetic fields anywhere nearby or use thermo-electric or solar thermo-electric conversion for more charge and/or compensation.

The Rotating Disc

The rotating disc according to the present invention comprises a ring, a multitude of flaps (4), joints such as mechanical and/or magnetical joints, as well as one or more generators. The ring is preferably the same as defined above, in particular an expandable and shrinkable ring as described.

The flaps (4) are the same as defined above comprising a battery recharge element. The joints required for the rotating disc are as defined above and connect the flaps (4) to the ring, which is preferably in the center of the rotating disc. The joints enable to fold the flaps (4) i) from open position of disc shape to closed position with a shuttlecock shape and ii) in disc shape to twist or turn to flaps (4) in open position to remain in open position, preferably to be turned by an angle of 30° or more, in particular by an angle of up to 90° or more, to form a turbine-like shape. Hence, each flap (4) can rotate on its own. Additionally, the rotating disc may optionally further comprise a motor or engine, e.g. a low powered engine, and/or a converter (2c) to adopt the current from the generator to the battery and/or from the battery to the current used by the motor or engine. All these components are commercially available and known to the skilled person in the art. Hence, the rotating disc according to the invention is a multi-source energy charging rotation disc.

In the following figures are no-limiting embodiments shown, which are not restricting nor narrow the invention. These explanations are part of the description. It shows:

FIG. 1: An exemplary and non-limiting shape of the Multi-Task Frisbee-Umbrella, MTFU (1), i.e. unmanned aerial vehicle (1), i.e. UAV, of the invention in closed position with a shuttlecock shape. The propellers (3) are schematically shown to be attached to the control apparatus (2). Some of the folded flaps (4) are folded in a way to provide an aerodynamic stability, e.g. being wing-like, while others form more a continuous body around the vehicle (1), when flying. Furthermore, in this specific embodiment, batteries (2a), engines (2b) and a converter (2c) are shown in between two adjacent flaps (4). The batteries (2a), engines (2b) and converter (2c) can be in any sequence, thus their order is unspecified. They also could be placed inside and/or on the surface of the control apparatus (2). Hence they are in addition—or as an alternative—to batteries (2a), engines (2b) and converter (2c) being present in the control apparatus (2).

Figure 2:
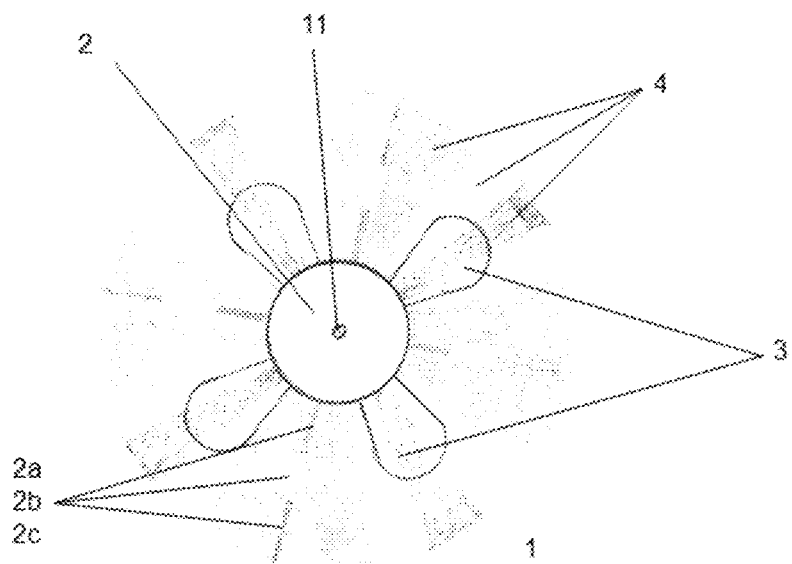

FIG. 2: An exemplary and non-limiting shape of the MTFU (1), i.e. vehicle (1), in open position from top view. It shows the control apparatus (2), the propellers (3) and a number of flaps (4) having different sizes and shape, thus being different types of flaps (4). Again, batteries (2a), engines (2b) and converter (2c) are shown in between two adjacent flaps (4). In the middle of the control apparatus (2), as shown in FIG. 2, a laser, i.e. a laser beam, (11) may come out, when initiated by the operator.

Figure 3:
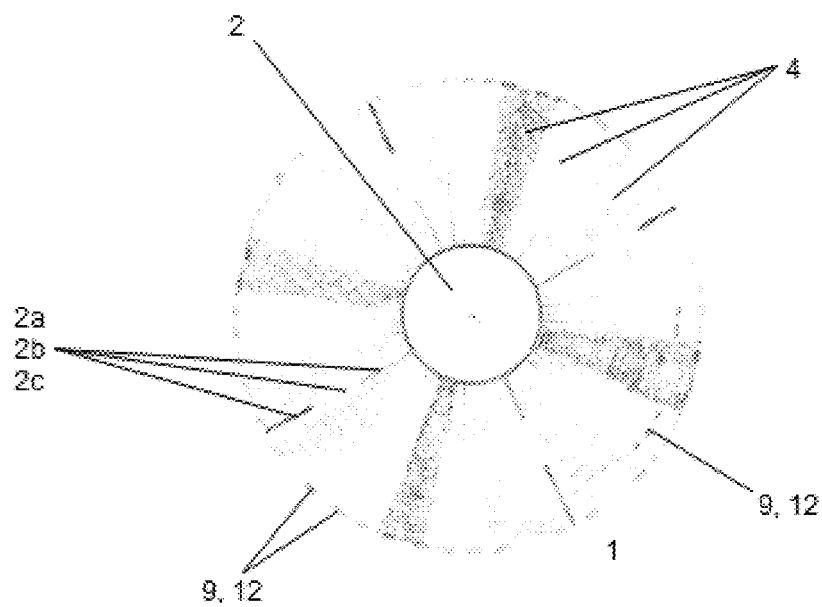

FIG. 3: An exemplary and non-limiting shape of the MTFU (1), i.e. vehicle (1), in open position from bottom view. It shows the control apparatus (2), batteries (2a), engines (2b) and a converter (2c), which may be in any sequence, thus their order is unspecified. Furthermore a number of flaps (4) are shown, which have in FIG. 3 different sizes and shape, thus being different types of flaps (4). At—or toward—the edges of flaps (4) are pads (9) and wheels (12) mounted, which may be flush and/or pivotable into the flaps (4).

Figure 4:
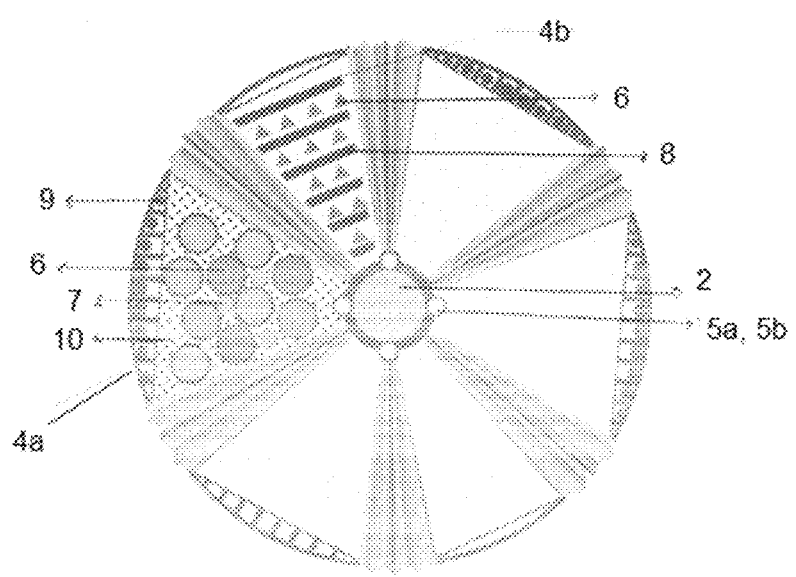

FIG. 4: An exemplary and non-limiting embodiment of the bottom side of the MTFU (1) design for military use with the control apparatus (2) and one or different types of camera (5a, 5b). One type of flap (4), in FIG. 4 shown as segment "a" (4a), carries inlaid multiple colorful lights (6), possibly blinking, for creating dizziness, confusion, temporary malfunction of the eyesight, etc., mixed with a few smaller holes/chambers for exerting mild electric impact (7) on the subject. The dotted background on the segment represents the dispatching of special sounds and or beams (10) of any type or frequency for various purposes may be created and emitted, including but not limited to creating annoyance, confusion, fear or the transfer of special verbal messages such as orders, etc. They could redirect or stunt the subject. Another type of flaps (4) is shown as Section "b" (4b) in FIG. 4. They may comprise or even consist of inlaid triangular or any other shaped lights (6) for the creation of further dizziness to support the effect of the lights (6) on its adjacent segments. The lines on segment "b" represent aerosol chambers (8) for emitting any type of substance in form of gas or other for creating numbness, pacify the subject or other effects. In this figure, pads (9) are arranged at the outer edge of the flaps (4). The MTFU (1), i.e. the saucer, may contain sections "a" (4a) and "b" (4b) of the flaps (4) alternately rotating fast during mission.

Figure 5:
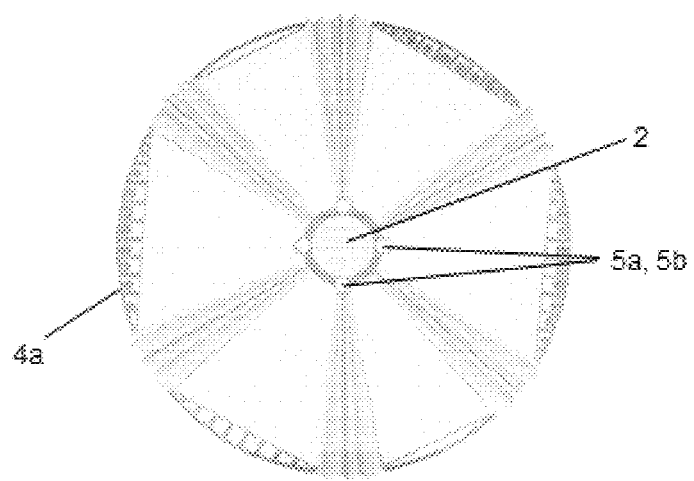

FIG. 5: FIG. 5 shows the top view of the MTFU (1) from FIG. 4 with the control apparatus (2), flaps (4), which are shown exemplary as Section "a" (4a), and one or different types of camera (5a, 5b), wherein the propeller (3) is not shown.

Figure 6:
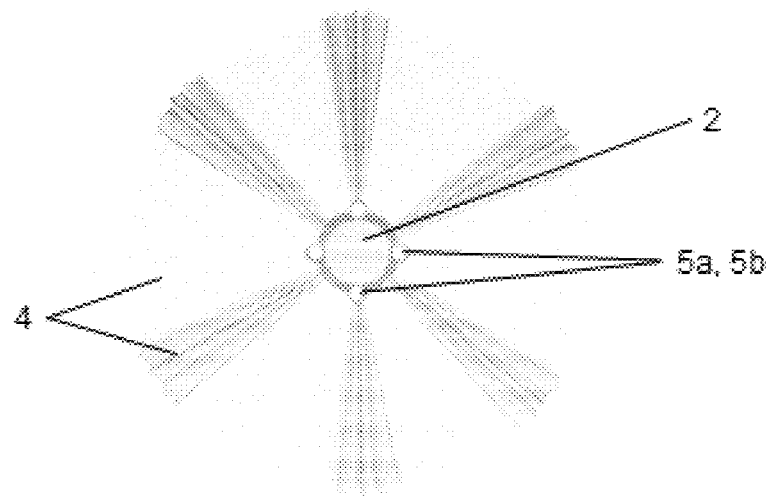

FIG. 6: The view of one possible embodiment of a double layered device from top is shown in this figure with the control apparatus (2), different types of flaps (4), and one or different types of camera (5a, 5b). Again, the propeller (3) is not shown.

Figure 7:
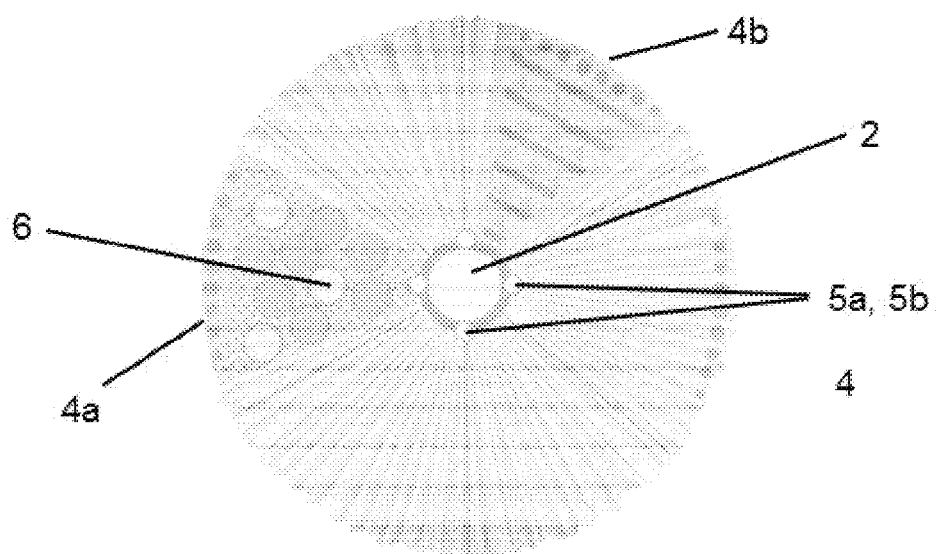

FIG. 7: FIG. 7 is a demonstration of an all folding version (bottom view) in a non-rigid material where the lights (6) are inlaid secure in between the folding lines. When open, however, all segments will become flat to exercise the most effect for outcome. Please note that due to the limitation on computer graphics, the folding lines are shown overly intense whereas the folds can be more relaxed. Also the control apparatus (2), flaps (4), which are shown exemplary as Section "a" (4a) and Section "4b" (4b), and one or different types of camera (5a, 5b) are indicated.

Figure 8:
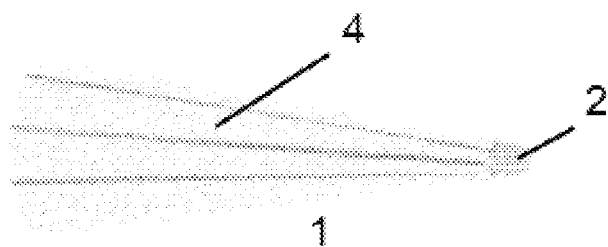

FIG. 8: FIG. 8 shows the MTFU (1) in closed position, i.e. in shuttlecock position, i.e. in closed umbrella position and thus the flaps (4) are in closed position and the control apparatus (2) is e.g. the front, i.e. the moving direction. This Figure may represent a double layered version, i.e. with two layers of flaps (4) above each other. The pads (9), such as suction cups, remain inside and that is why they are not shown.

Figure 9:
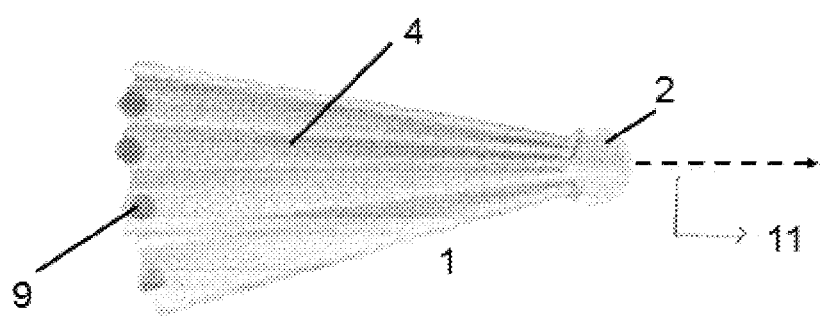

FIG. 9: As in FIG. 8, FIG. 9 shows the MTFU (1) in closed position, i.e. in shuttlecock position, i.e. in closed umbrella view, on an all folding non-rigid version, i.e. comprising flexible flaps (4) with pads (9) at the outer edge of the flaps (4). There is a possibility to have a version with a ring on the battery, holding a drill. This version is shown in this FIG. 9 for demonstration. The drilled version of the control apparatus (2) may be used in cases where the umbrella needs to enter some premises through the windows or a thin wall. In this case, a drill or laser (11), i.e. laser beam (11), can cut a circular portion of glass, etc. after which the umbrella will turn a 180° degrees where the pads (9), e.g. the suction cups or pads comprising gecko-type adhesive, may pull out the cut piece and the umbrella may enter the premises to perform its mission.

The invention claimed is:
1. An unmanned aerial vehicle comprising
a) a control apparatus which comprises
   i. one or more batteries,
   ii. one or more engines, and
   iii. a communication transmission system for remote control,
b) one or more propellers capable of rotating around a common axis in a plane substantially perpendicular to the axis, the one or more propellers are fixed to the control apparatus,
c) a plurality of flaps which are movable reversibly from an open to a closed position, the flaps being fixed symmetrically around the control apparatus, wherein the flaps provide
   in the open position, at least a portion of the flaps form a continuous body around the vehicle in a disc shaped configuration which is substantially parallel to the plane of the rotating propeller, and
   in the closed position, a shuttlecock shaped configuration, wherein one or more of the flaps can, independently of the other flaps, be turned or twisted while in the open position or closed position to form wings or a turbine shaped configuration.

2. Vehicle of claim 1, wherein the vehicle further comprises one or more devices selected from the group consisting of a camera, a visible or infrared light source, a blinking light, a holographic projection device, a sound device, a variable frequency sound device, a microphone, a GPS system, a data-recording device, a gyroscope, a laser device, a microwave device, an electro-magnetic device, a warhead, a weapon system, a multi-spectral weapon system.

3. Vehicle of claim 2, wherein the camera is a surveillance camera, high resolution camera, TV-camera, day light camera, UV-light camera, an infrared camera or a thermographic camera.

4. Vehicle of claim 2, wherein the gyroscope is present on a propeller, a wheel, or a flap of the vehicle.

5. Vehicle of claim 2, wherein the visible or infrared light source, the blinking light, or a combination thereof are present on one or more of the flaps.

6. Vehicle of claim 1, wherein the flaps are attached either directly to the control apparatus or to a ring which is attached to the control apparatus, wherein the ring is a ring which can expand and shrink its dimensions.

7. Vehicle of claim 6, wherein the flaps form a rotating disc and wherein the vehicle further comprises a generator to turn the rotation of the rotating disc into electric energy.

8. Vehicle of claim 1 wherein at least one of the flaps comprise a battery recharge element, the battery recharge element comprises a solar panel, a photovoltaic element, an electromagnetic harvesting element, a thermoelectric generator or a solar thermoelectric generator.

9. Vehicle of claim 1, wherein the flaps comprise side edges comprising a coupling device to couple the adjacent flaps together.

10. Vehicle of claim 1 further comprising means for recharging the battery or batteries from power lines or telephone lines or from using rotation of the flaps.

11. Vehicle of claim 1 further comprising one or more wheels that are flush or pivotable.

12. Vehicle of claim 1 further comprising one or more durable pads, wherein the pads are flush or pivotable.

13. Vehicle of claim 12, wherein the pads further comprising an adhesive.

14. Vehicle of claim 1 further comprising one or more vacuum cups.

15. Vehicle of claim 1, wherein the vehicle comprises one or more segments and a portion or chamber of one or more of the segments is self-destructive.

16. Vehicle of claim 1, wherein one or more propellers are directly or indirectly fixed to the control apparatus.

17. Vehicle of claim 1, wherein the flaps are camouflaged.

18. Vehicle of claim 1, wherein the flaps comprise an element or a component.

19. Vehicle of claim 1, wherein one or more vehicles are grouped together or are in a coordinated line or arrangement.

20. Vehicle of claim 1, wherein the vehicle is formed into various shapes by use of the movable flaps.

* * * * *